INVENTOR.
JOSEPH M. MURGIO
BY Charles L. Johnson Jr.
ATTORNEY

INVENTOR.
JOSEPH M. MURGIO
BY Charles L. Johnson Jr.
ATTORNEY

INVENTOR.
JOSEPH M. MURGIO
BY Charles L. Johnson Jr.
ATTORNEY

INVENTOR.
JOSEPH M. MURGIO
BY Charles L. Johnson Jr.
ATTORNEY

INVENTOR.
JOSEPH M. MURGIO

BY Charles L. Johnson Jr.

ATTORNEY

INVENTOR.
JOSEPH M. MURGIO
BY Charles L. Johnson Jr.
ATTORNEY

INVENTOR.
JOSEPH M. MURGIO
BY Charles Johnson Jr.
ATTORNEY

INVENTOR.
JOSEPH M. MURGIO
BY Charles L. Johnson Jr.
ATTORNEY

OUTGOING CW STATUS WORD CODING

INVENTOR.
JOSEPH M. MURGIO
BY Charles L. Johnson Jr.
ATTORNEY

INCOMING CW STATUS WORD CODING

INVENTOR.
JOSEPH M. MURGIO
BY Charles L. Johnson Jr.
ATTORNEY

CLASS A & B SEND LINE CIRCUIT

CLASS C SEND LINE CIRCUIT

INVENTOR.
JOSEPH M. MURGIO
BY Charles L. Johnson Jr.
ATTORNEY

April 8, 1969 J. M. MURGIO 3,438,002

PULSE SIGNAL EXCHANGE

Filed May 31, 1966 Sheet 12 of 14

INVENTOR.
JOSEPH M. MURGIO
BY Charles L. Johnson Jr.
ATTORNEY

April 8, 1969 J. M. MURGIO 3,438,002

PULSE SIGNAL EXCHANGE

Filed May 31, 1966 Sheet 13 of 14

INVENTOR.
JOSEPH M. MURGIO
BY Charles L. Johnson Jr.
ATTORNEY

* PREFIX SIGNALS DEPEND UPON TYPE OF LINE PRIORITY NET. SELECTS

| | 5 | 6 |
|---|---|---|
| CLASS A/B IN | 0 | 0 |
| OUT | 0 | 1 |
| CLASS C IN | 1 | 0 |
| CLASS C OUT | 1 | 0 |

SCANNER BLOCK DIAGRAM

INVENTOR.
JOSEPH M. MURGIO
BY Charles L. Johnson Jr.
ATTORNEY

United States Patent Office
3,438,002
Patented Apr. 8, 1969

3,438,002

PULSE SIGNAL EXCHANGE

Joseph M. Murgio, Clifton, N.J., assignor to International Telephone and Telegraph Corporation, Nutley, N.J., a corporation of Delaware Filed May 31, 1966, Ser. No. 553,847
Int. Cl. G06f *7/24*
U.S. Cl. 340—172.5 9 Claims

ABSTRACT OF THE DISCLOSURE

An input-output device for automatically exchanging pulse information signals between a multiplicity of signal lines and a central processor such as a digital computer. The device includes common hardware for time sharing the signal lines and includes bit-at-a-time character assembly-disassembly with variable speed sampling for accommodating various types of signals and recurrence rates.

This invention relates to a centralized pulse signal exchange facility for automatically and selectively conveying pulse information signals between a multiplicity of signaling lines and a central processor such as a digital computer.

In the design of presently known exchange facilities, it has hitherto been considered common practice to provide an individual character buffer unit per signaling line which is adapted to independently time the receipt or transmission of pulse signal elements in discrete character groups. Depending upon the system requirements such character buffer units may be adapted to gather and store each character group of pulse signal elements at one recurrence rate and to forward the same character elements at a different recurrence rate. This is necessary, for example, where teletype character signal elements recurring at a low line signalling frequency are to be transferred in serial form to a high speed serial access memory.

It is therefore quite apparent that in presently known systems serving a large number of signaling lines a considerable amount of per line hardware is required. Incidental to this, it is noted that the known systems are operating inefficiently and wastefully when less than a predetermined maximum number of lines are kept busy.

Accordingly, an object of this invention is to provide a more economical and efficient system for automatically exchanging pulse information signals between a multiplicity of signal lines and a central processor such as a digital computer.

A system organized in accordance with the foregoing object characteristically comprises a large number of signaling lines and a common input-output device which are interconnected either directly or through single signal element regenerators such as flip-flops. The common input-output device is characterized by the inclusion therein of a rapid access memory unit having an assembly-disassembly storage cell therein allocated to each line, a scanning control unit which is operative to cyclically address the lines and the corresponding assembly-disassembly storage cells in a predetermined multiplex scanning sequence of sufficiently short duration to reliably ensure addressing of the line having the highest characteristic signal element recurrence rate during each signal element interval thereon, and means operated in step with the scanning unit, and under the control of information stored in the assembly-disassembly storage cells, for selectively transferring a signal bit element between each addressed line and an appropriate bit storage position in the corresponding assembly-disassembly storage cell during a predetermined scanning cycle which is selectively determined by common timing circuits. This common device is thus capable of directly transferring the bits of a character signal group between any line and the corresponding assembly-disassembly storage cell without the aid of an individual buffer line unit and, therefore, without a separate character signal timing device and a separate character buffer register for each line, as required in previous buffer line units. When a complete character has been thus assembled in or transferred from a corresponding assembly-disassembly storage cell, certain control information stored in the same cell is altered automatically so as to thereafter exert automatic control over the transfer either of an assembled character to an associated word storage cell reserved for assembly of groups of message characters taken from a particular line under consideration or, respectively, to control the transfer of a next successive character from a word storage cell to the corresponding assembly-disassembly cell from which the bits are thereafter to be individually played out to a central processor or digital computer. In like manner, signals received from the central processor are transferred to an outgoing line.

By such means, entire messages are automatically taken off incoming lines on a bit-by-bit basis and assembled first into characters and then into character pairs, and the pairs are transferred to a digital computer where entire messages are assembled. Similarly the converse procedure, that required to transfer a stored message to an outgoing line on a bit-by-bit basis, is automatically carried out by means of a progressive disassembly of the message into successively smaller groupings after transfer from the digital computer within the memory storage areas reserved therefor.

The communications between the central processor and the input-output device are timed so as not to interfere with the cyclic line scanning procedure carried out within the input-output device.

It should be noted that by virtue of the organization of the input-output device, as characterized above, the form and recurrence rate of the signals carried on any line may be varied and all that is required to adapt the input-output device is a simple variation of one or more control bits stored in the corresponding assembly-disassembly storage cell. In contrast, prior art buffer line units usually require extensive overhauling or replacement to accomplish the same result.

The foregoing and other objects and features of the invention will be more fully understood and appreciated upon consideration of the following detailed description of a system organized in accordance therewith, said description being intended to be read in conjunction with the accompanying drawings wherein.

Figure 1:
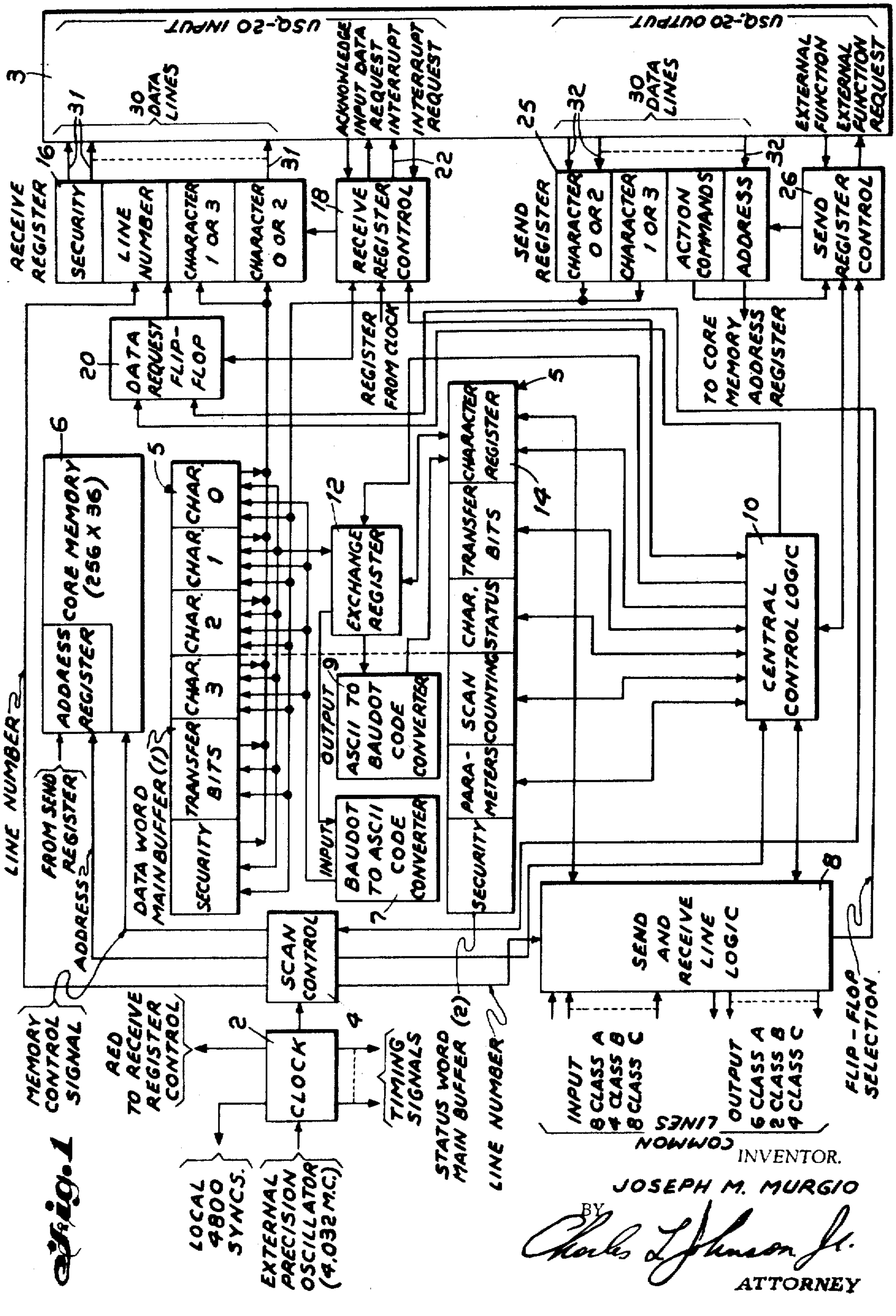
FIG. 1 is a schematic block diagram of the input-output unit of the invention.

The preferred embodiment of the invention is directed to proving three classes of service designated A, B, and C and defined below. The mixture of classes in the described embodiment constitutes, for input, 8 class A, 4 class B and 8 class C lines for a total of 20 input lines. Output lines will be described herein as comprising 6 class A, 2 class B and 4 class C for a total of 12 output lines.

This class A type line will be treated as a synchronous data line with any allowable bit rate up to 4800 b.p.s. when the "*k* bit" in the line status word is a "zero." This type line will be treated as a low speed teletype or continuous wave line when the "*k* bit" (Main Buffer Bit 27) in the line status word is a "one."

The class B type line will be treated as a synchronous data line with any allowable bit rate up to 2400 b.p.s. when the "*k* bit" (MB27) in the lines status word is a "zero." This type line will be treated as a low speed teletype or continuous wave line when the "*k* bit" in the lines status word is a "one."

The class C type line will be serviced as a low speed line. The "*k* bit" must always be a "one."

As will become apparent from the following discussion, the members of each class are not gang switched. Each member is specialized into high speed or low individually by central processor change of the *k* bit in the individual status words.

Note also that the specialization of a line as input or output is predetermined by the scan control. Input lines may not be changed into output lines or vice versa.

The service given any line depends on the paramcter settings in its status word. The "*k* bit" (MB27) first divides the service between high and low speed.

The high speed lines ($K=0$) are considered synchronous data lines. They will accept synchronous data at any speed up to their rated maximum. The maximum allowable data rate depends on the line class with Class A=4800 b.p.s. and Class B=2400 b.p.s. All high speed lines handle only seven bit characters.

The low speed lines, where $K=1$ are considered Teletype or CW lines. As will become more meaningful as the description progresses, further specialization of the line type is as follows:

Teletype if the "T bit" (MB33) is a "zero."

Machine CW if the "T bit" (MB33) is a "one."

For Teletype, character synchronization will be triggered by a ONE-ZERO transition.

For Teletype, two character lengths are allowed:

Character is 5 bits if "L bit" (MB30)=0
Character is 7 bits if "L bit" (MB30)=1

These have unit assignments in which a 5-bit character comprises 1 unit START, 5 units of DATA and a STOP unit while the 7-bit characters comprise 1 unit START, 7 units DATA, 1 unit MARK and 1 unit STOP for a total of 10 units.

Input five bit characters shall be preceded by a one unit start bit and have a one unit minimum stop bit. This accommodates 7.0, 7.42 and 7.50 codes. Output five bit characters are sent in 7.00 code. For input seven bit characters, a one unit start and a one unit stop shall be used. The parity bit position must be a mark for incoming 10 unit code. On output a 10 unit code will be used with the parity bit position always a mark.

For Teletype, the following baud rates may be accommodated in the preferred embodiment. With a 5 bit character setting, 45.0, 50.0, 75.0 and 225 baud and with a 7 bit character setting, 45.0, 50.0, 100.0 and 225 baud. Class C output lines may not be used for 100 baud operation because the Class C output lines are not scanned on integral number of times in this baud time. Class C output lines set up for 100 baud will transmit a 50 baud.

For Machine continuous wave code rates of 19.56, 40.9, 56.0 and 75.0 b.p.s. are allowed.

In the embodiment described no code conversion will be performed when input data being handled is in seven bit characters, high speed lines or 7-bit Teletype, or when handling continuous wave lines.

Code conversion from 5 bit Baudot to 7 bit ASCII will be performed for incoming 5-bit Teletype lines only when the "code conversion bit" (MB29) in the lines status word is a "one."

Code conversion from 7-bit ASCII to 5 bit Baudot will be performed for outgoing 5 bit Teletype lines only when the "code conversion bit" (MB29) in the line status word is a "one."

Table I gives the chosen Baudot-ASCII equivalents. Table II gives the relationship between the Machine CW codes and the special input-output control compressed version. This code will be transferred to the central processor for incoming MCW lines and must be received from the central processor for outgoing MCW lines.

All 7 bit character lines (high speed or 7 bit Teletype) will perform a message delimiter hunt for ASCII delimiters as follows:

SOM (0000001) Start of Message
EOA (0000010) End of Addressees
EOM (0000011) End of Message
EOT (0000100) End of Transmission However, high speed lines will not perform the message delimiter hunt when the "Enable" bit (MB30) is a zero.

All 5 bit character Teletype lines will perform a message delimiter hunt for Baudot sequences of ZCZC for Start of Message and NNNN for End of Message.

The input-output control response for any End of Message or End of Transmission will be to immediately complete the character pair, if the delimiter did not do this itself. This is to ensure that no End of Message character gets trapped in the input-output control storage, since all data transfers are by character pair.

The method chosen for notifying the central processor of message delimiters is such that any character pair containing a message delimiter will have a single bit in the transfer word set to "one" as it is transferred to the central processor. Otherwise this bit is a "zero." The input program will test this bit during its handling of the transferred data word.

It should be noted that if a Baudot to ASCII conversion is made in the input-output control, the ZCZC in Baudot will be converted into ZCZ(SOM) in ASCII. The half word transfer containing the character (SOM) will be marked as containing a delimiter. Likewise NNNN in Baudot will be converted into NNN(EOM) in ASCII. If the (EOM) character did not complete a character pair, the translation will result in NNN(EOM) (Blank) being sent to the central processor. The message delimiter actions are shown in detail in Table III.

The In/Out will utilize a single duplex central processor channel. All necessary interface circuits are provided within the input-output control. Isolation of the In/Out unit from the central processor when the In/Out is deactivated, by enabling the In/Out maintenance panel or removing AC power, is by relay contacts inserted in the Interrupt, Input Data Request, Interrupt Request, External Function and External Function Request Lines. For input messages, the In/Out will assemble bits into a two character halfword. This will be transferred to the central processor via an "Input Data Request" signal along with a half-word tag which identifies the line on which the character arrived. For output messages, the USQ–20 will be periodically interrupted by the In/Out and sent a word which identifies those lines which require new characters. This will then correlate to a table within the central processor of these lines that are active. The program will then send a two character halfword and an address halfword via an external function to the storage word location associated with each of the selected lines.

If high speed output lines run out of characters, an abnormal condition, they will continue to send no message characters. If Teletype output lines run out of characters, they will send a steady mark, stop bits. These conditions are also the "off" state for any of these lines.

For Teletype signals a mark shall be +6 volts and a space shall be −6 volts. For high speed data lines, a "one" shall be +6 volts and a "zero" shall be −6 volts. Each data line shall be accompanied by a sync signal having a square wave period equal to the data rate. The data signal shall be settled within 30 μsec. of the positive transition (−6 volts to +6 volts) of the sync pulse. It shall not change earlier than 170 μsec. after the positive transition of the sync pulse.

The input-output device of the invention is shown in block diagram form in FIG. 1. The basic internal timing pulses, the local 4800 b.p.s. sync wave train, and the request signal are supplied by the clock 2. The 4800 b.p.s. local sync train is for use with Class A lines interfacing with local devices which may not be able to provide a sync signal of their own. The request signal is a periodic 3 ms. pulse which serves to trigger the feeding of the output data lines character requests to the central processor 3.

The clock 2 also supplies the real time basis for line scanning to the scan control 4. The scan control 4 generates status word addresses, and line number coding for the select decodes, in such a manner that all status words are scanned according to the requirements of their class. The scan control supplies signals to the main buffer logic 5 to indicate the usage of each word as it comes from the core memory 6. Such uses may be input, output, status, or data. It also regulates the usage of core memory for other transfers such as character transfers between the status and data words and between the data words and the central processor interface registers 16 and 25.

The core memory 6 is used for status and data word storage with one each per simplex line. In the preferred embodiment there will be 32 status words and 32 data words. Remaining core space is spare. The status and data word coding, as well as the interface register coding are shown in FIGS. 2–13. The abbreviations used are defined as follows:

N—Intercharacter Space Bit (CWOUT)
MDH—Message Delimiter (SOM, EOM, etc.)
V—Variation-Tells if this is a data word or Action Command
K—Line Speed (High or Low)
E—Enable-High Speed Message Delimiter Hunt Control Bit
BA—Byte Address
SF—Security Failure
O/F—Overflow
W—CW Alignment Bit
T—Type or service (CW, TTY)
BR—Baud Rate
L—Character Length
C—Determines if code conversion is necessary
D—Message Delimiter Present (SOM, EOM, etc.)

A—Character 1 and 2 halfword
B—Character 1 and 2 halfword
R—Request for character transfer
F—Line is "off"
CSC—Character State Counter
Stop-Bit Z—Extension of CSC to Count 9 for Stop Bit.
H—Past History Bit
P—Position Bits—where in data word new char. goes
G—Character Sync. Obtained
M—Monitor Bit
UC—Unit Counter-advances when scan counter=0
J—CW transmission Finished (after time out)
S—Character Start
SC—Scan Counter As the scan control 4 retrieves status words one by one from core memory 6, the words are placed in the main buffer 5 for "line unit" handling actions. These functions of the main buffer are shown in the lower main buffer diagram in FIGURE 1. As the scan control 4 generates the core address, it also generates a line number for line selection purposes in the decode apparatus 8. When a Class A or B line is decoded, the high speed sync flip-flop set aside for that line is also selected. If the line is acting as a low speed line, the sync is ignoted by the main buffer logic 5 during the line unit actions. The main buffer sync logic controls the synchronization of the data on the line as a function of the parameter bits in the status word. The main buffer bit handling logic controls the assembly or disassembly of characters.

The Exchange Register 12 in conjunction with the transfer control is used for the transfer of characters between the character register 14 in the status words and the character spaces in the related data words. During these transfers, the code conversion is performed if required. Alternate data and status words are placed in the main buffer with 5 indicating use as a data word and 5′ as a status word.

The upper main buffer diagram in FIGURE 1 indicates its use for data words as 5′. Each line will have four characters of back up storage. For input lines when a character pair, either characters 0 and 1 or characters 2 and 3, is complete, that line will continually request access to the Receive Register 16 to send the character pair to the central processor 3. Upon coincidence of a status word indicating this condition while in the main buffer and the Receive Register being free, the scan control 4 will allow the next core memory cycle to be devoted to the removal of the character pair from the data word. The character pair is unloaded from the data word and loaded into the Receive Register control 18 then raises the input data request line to the central processor 3.

For output lines, when a character pair empties, character 1 or character 3 is moved down to the status word, the request flip-flop for that output line is set. When the clock 2 sends the request signal, the next time the Receive Register 16 becomes free, the 12 request flip-flops 20 are transferred into the Receive Register 16 and the Interrupt line 22 is raised to the central processor. The request flip-flops 20 are then reset.

In response to the output data requests sent by the Interrupt, the processor computer 3 will send character pairs for the proper lines. It should be noted that these characters are not necessarily sent during the time the processor computer processes the Interrupt. The data is sent by External Function signal 24 to the Send Register 25. The Send-Register control 26 in conjunction with the exchange register 12 files each character pair according to the accompanying address.

It should be noted that the Receive Register 16 is shared for both input data transfers to the central processor and the interrupts. Unless the central processor program is capable of honoring both types of inputs, the channel will become blocked, waiting for an acknowledge and improper operation will result.

Additional functions of the Send Register 25 are specified by the command codes. When the "variation bit," Send Register Bit 29, is a "one," the three command bits (SR 9–11) specify the special action. These functions are described in detail in Table IV.

Provision has been made for security tagging of all data stored within the input/output control unit. In addition, a security check is made for each character before output transmission.

The security handling will now be described.

Security level is established for each input line when the central processor sets up the parameter section of each lines status word. Bits 35 contain the security coding according to FIGURE 2. As characters are assembled in a Status Word and moved to a Data Word, the security bits set aside for security coding in the Data Word (bits 34 and 35) are made the same as the coding in the Status Word. When character pairs are then moved from the Data Word to the Receive Register 16 for transfer to the central processor, the Data Word security coding is also transferred. The security coding appears in bits 25 and 26 of the resulting Data Halfword. This tagging enables the central processor to perform a security check as it sorts the incoming Data Halfword into per-line blocks.

Figure 2:
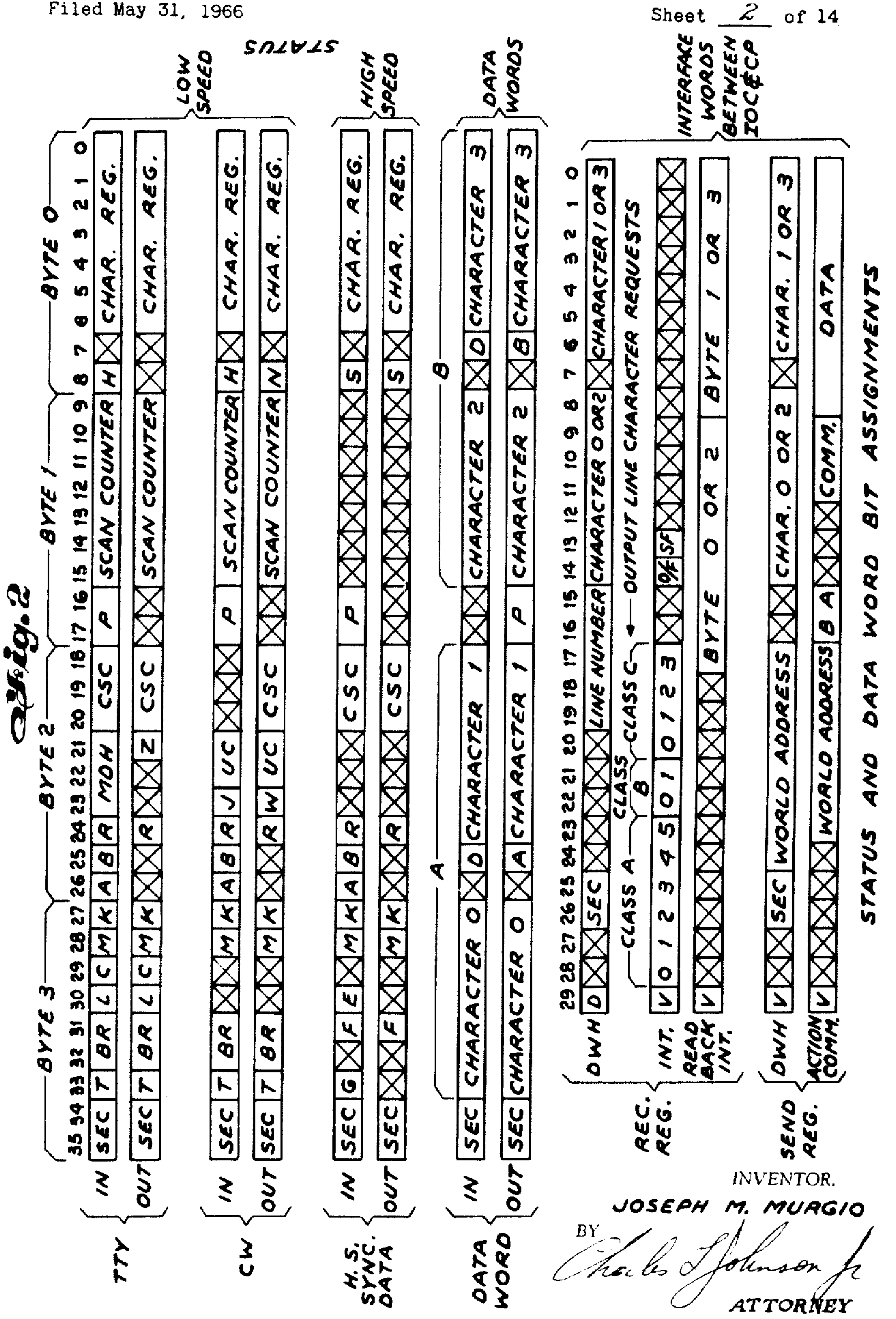
FIG. 2 is a schematic of the status and data word bit assignments.
Figure 3:
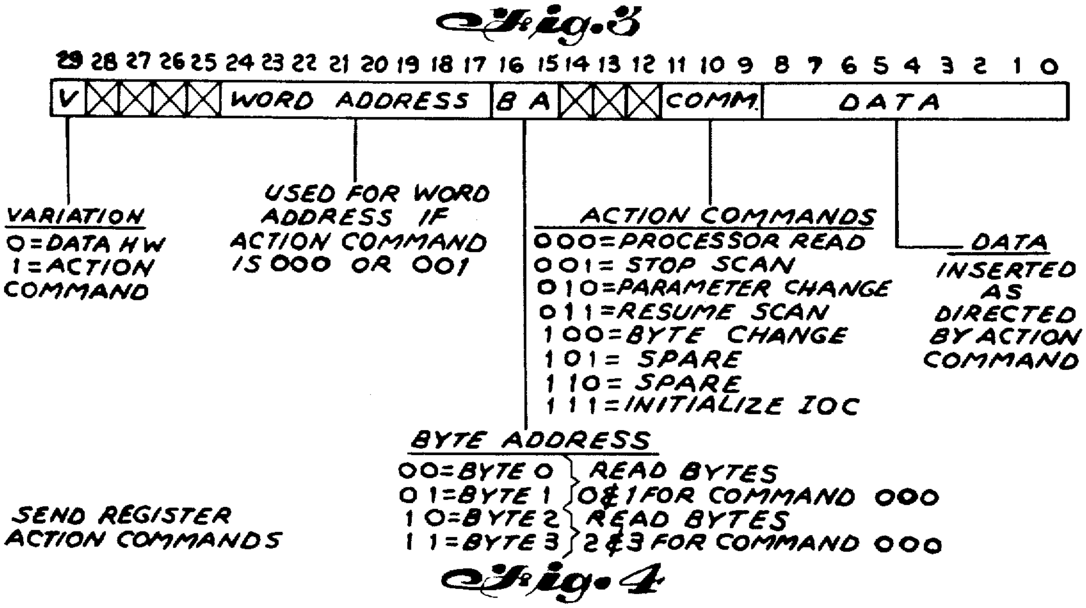
FIG. 3 is a schematic of the send register action commands.
Figure 4:
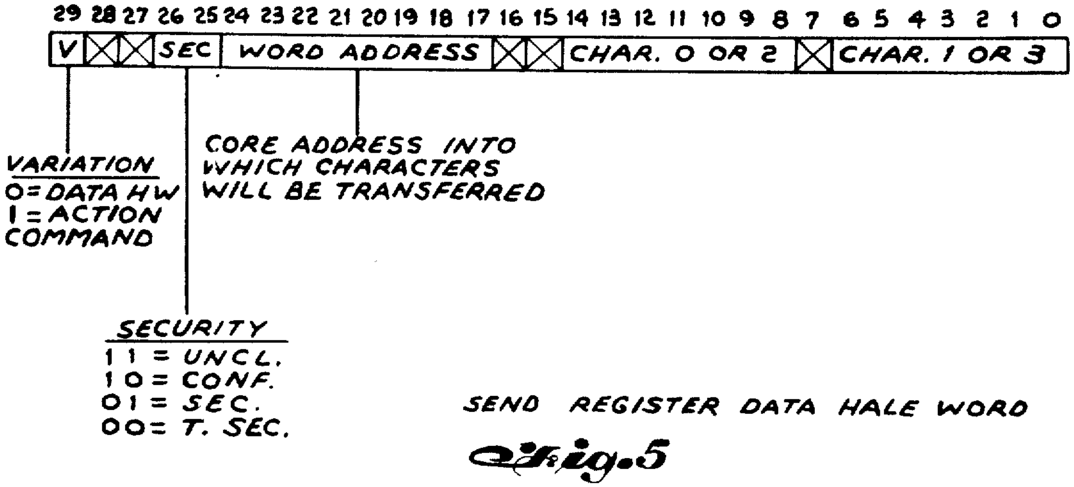
FIG. 4 is a schematic of the send register data half word.
Figure 5:
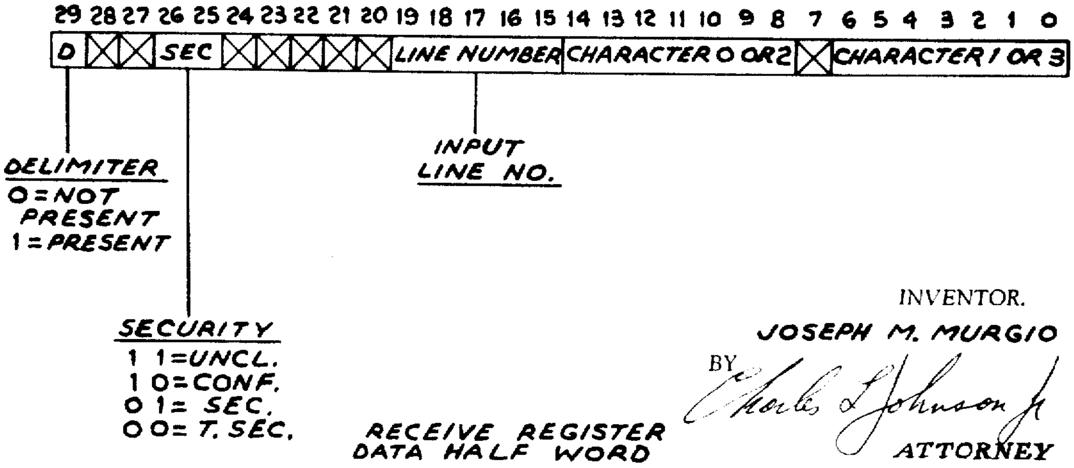
FIG. 5 is a schematic of the receive register data half word.
Figure 6:
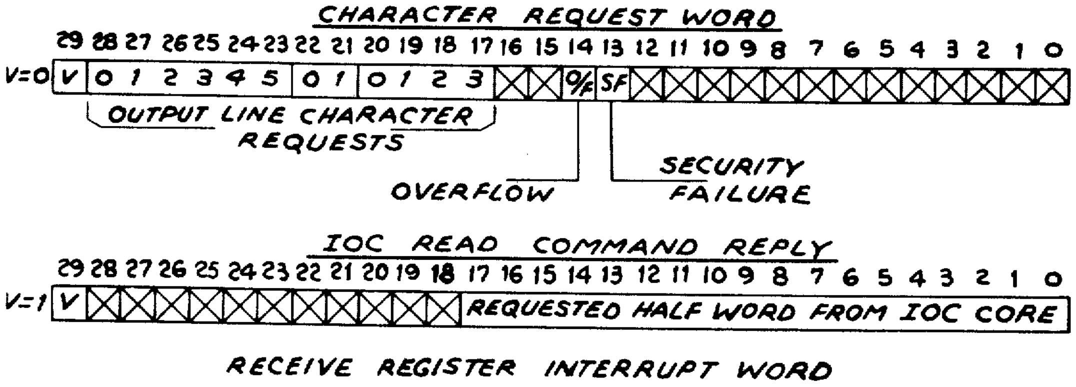
FIG. 6 is a schematic of the receive register interrupt word.

Each output Data Halfword arriving in the Send Register 25 from the central processor will contain the security coding for the addressed output line Bits 25 and 26. This coding will be placed into the output lines Data Word security coding, bits 34 and 35. Whenever a character transfer from the Data Word to the Status Word is attempted, a check is made to see if the Data Word and the Status Word security bits match. If they do, the transfer proceeds normally. If they do not match, the character is dropped and a blank is sent to the status word for disassembly. In addition the central processor is notified by the setting of the Monitor Bit, bit 28, in the output lines Status Word, and by the setting of the general security mismatch flip-flop. This condition is then reported to the CP by use of the Security Failure flag, bit 13, of the Character Request Word (FIGURE 2). A "one" appearing in this bit position indicates that one or more lines have had security mismatches since the last Character Request Word. Determination of the specific lines involved is made by central processor reading of the parameter sections of the output Status Words for set Monitor Bits.

Provision has been made for central processor notification when an overflow condition exists on any input line. Overflow is defined as the case where a character has been assembled in an input Status Word and all four character storage spaces in the Data Word are filled. Under these conditions, both the Monitor Bit, bit 28, of the lines Status Word and the general overflow report flip-flop will be set. This condition is then reported to the central processor by use of the Overflow flag, bit 14, of the Character Request Word. A "one" appearing in this bit indicates that one or more lines have had overflow situations since the last Character Request Word. Determination of the specific lines involved is made by central processor reading of the parameter sections of the input status words for Set Monitor Bits.

The core memory, 6 in the preferred embodiment, is a 256 word, 36 bits per word, 2 μsec. random access, coincident current magnetic core memory. It has an 8 bit memory address, and a 36 bit input-output buffer. The core memory has a data retention feature which will protect all stored data in the event of a power shutdown, either accidental or preplanned.

The scan control 4 performs the wired in scheduling for the scanning of line status words. All Class A lines are scanned once each 138.88 μsec. All Class B lines are scanned once each 555.55 μsec. All Class C Outgoing lines are scanned once each 2.222 ms. In addition the scan control allots incoming cycles for data transfers.

The input/output decode 8 selects one incoming signal line from 20 for sending to the main buffer logic. For all Class A and B lines, it also selects the lines sync flip-flop output for sending to the main buffer.

The decode 8 also connects the main buffer to one output of 12. For all Class A and B lines, it also selects the lines sync flip-flop output for sending to the main buffer. The output decode contains a flip-flop fo reach output line for pulse stretching purposes.

The main buffer is 36 bits long. It transfers data to and from the core memory buffer and to and from the exchange register, directly or through the code conversion.

The synchronizing logic does the interval measurement for Teletype and CW signals and the sync state comparison for high speed lines. It senses the scan count and parameter sections of the main buffer. It generates new constants for insertion into the scan count.

The bit handling logic supervises the bit flow to and from the decodes 8 and also updates the transfer areas of the status word upon completion of characters.

The exchange register 12 of FIG. 1 is a seven bit register used as an intermedaite device for moving characters between stored words. The exchange register can transfer to or from any of the four character positions in the main buffer. The exchange also drives the two code conversion devices. The transfer control contains the logic for controlling the timing and switching involved in transfers.

The code converters 7 and 9 are driven by the contents of the exchange register 12. Their outputs may be used when code conversion is required. When code conversion is not required during a character transfer, they are bypassed.

The Baudot to ASCII converter 7 is used in transfers from the character assembly area of a teletype status word to one of the character spaces in its data word. The conversion bit MB29 must be a "one" for this action.

The ASCII to Baudot converter 9 is used in transfers from the character storage spaces in a data word into the character disassembly area of an output Baudot teletype line status word, MR29 being a "one."

The 30 bit Receive Register 16 is the connection between the input-output control and the "input data lines" 31 of the central processor. On this channel are sent the completed character pairs with their tags; the bits from the Data Request Flip-Flop, during an interrupt, and the 18 bit byte pair of central processor requested words for reading during maintenance. The Receive Register Control 18 handles the standard central processor information interchange signals, and provides a "ready" signal to the scan control 4 for indication of the Receive Registers state.

The 30 bit Send Register 25 is the connection between the input/output control and the output data lines 32 of the central processor. On this channel are sent character pairs for outgoing lines, parameter change words, and maintenance commands. These signals are all sent as external functions from central processor. The Send Register Control 26 accepts the External Function signal from the central processor and sends a request signal to the Scan Control to indicate a word for core memory action.

The clock 2 divides down the basic input/output control frequency of 4.032 mc. for timing pulses and time-base generation for the communication line signals. The clock contains its own crystal oscillator when independent use of the input/output control is desired.

Figure 18:
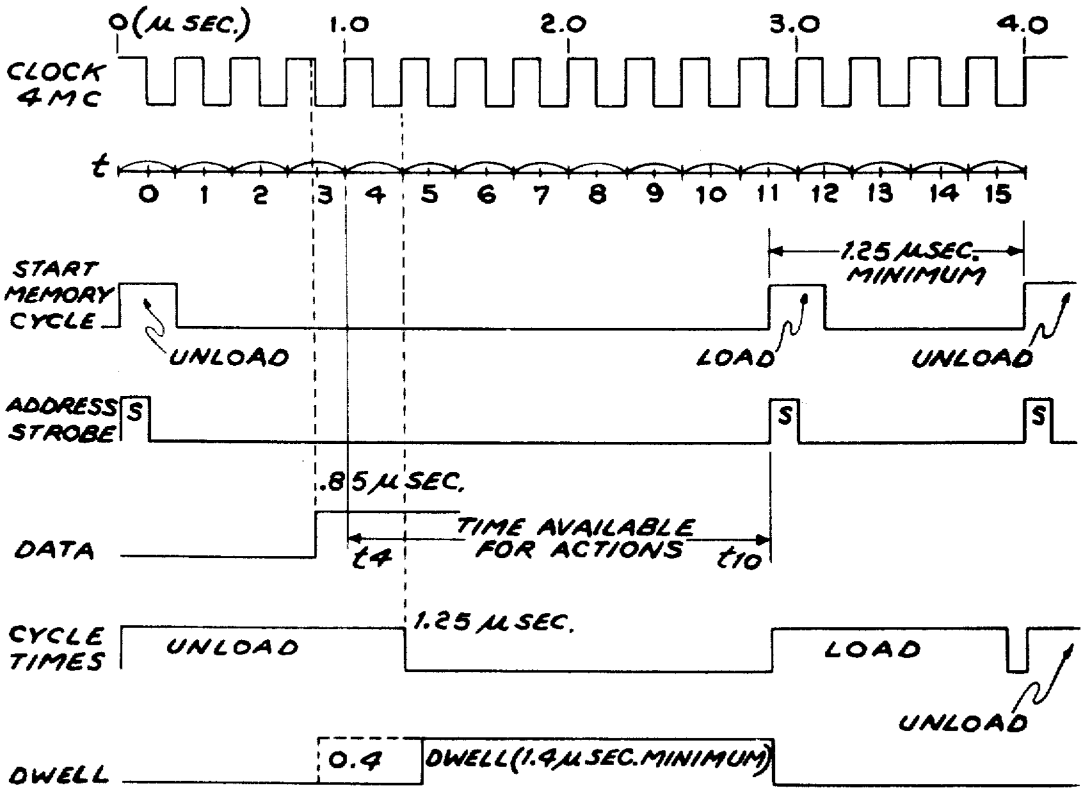
FIG. 18 is a timing diagram of the nominal memory cycle.
Figure 19:
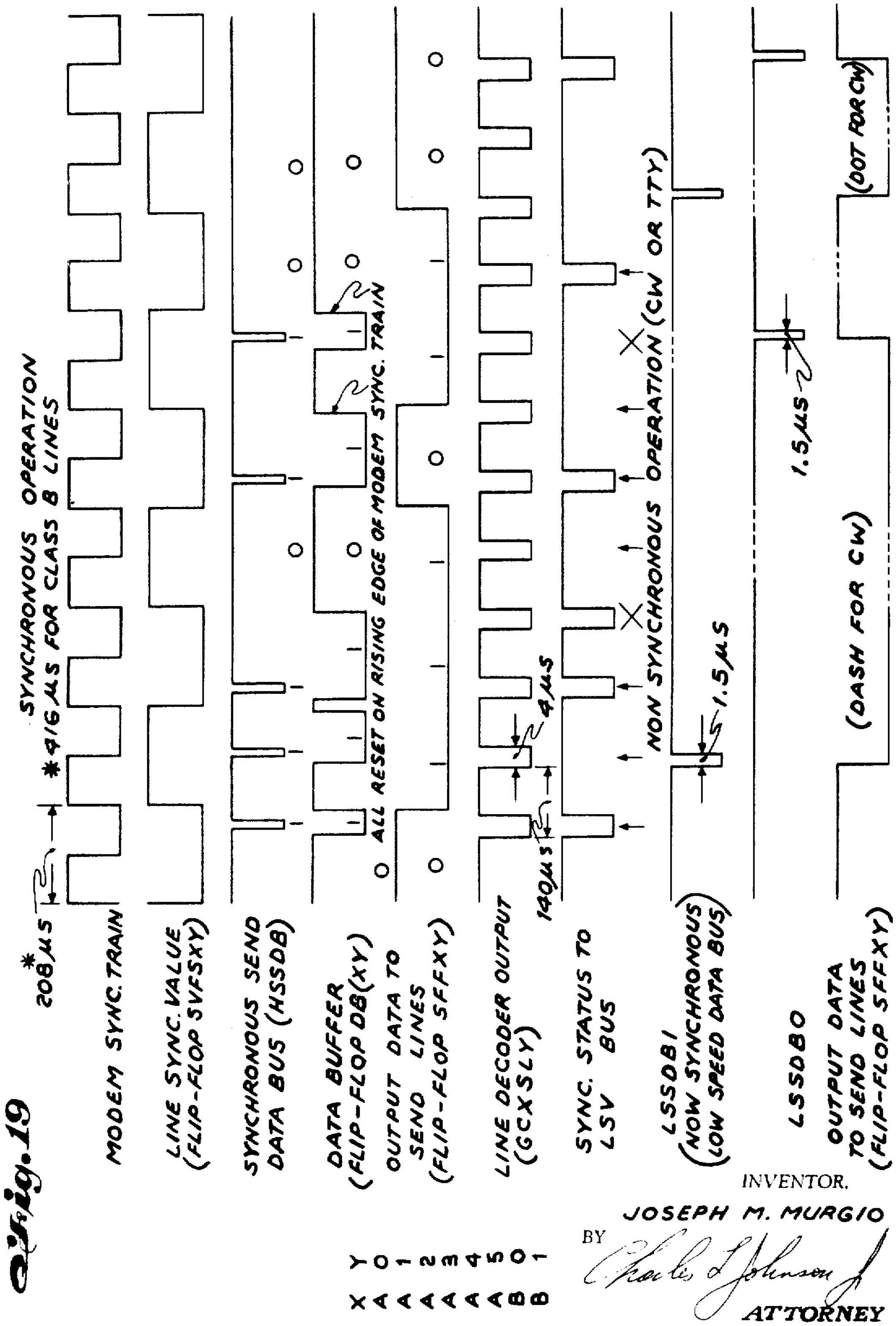
FIG. 19 is a line circuit timing diagram.

FIG. 18 illustrates the nominal memory cycle timing while FIG. 19 includes the timing waveforms for the various lines.

Referring to FIG. 19 it should be noted that the second sync status pulse is generated and sent to control logic since the 140 μs memory cycle time falls wholly within the time the line sync value is unchanged. However, this pulse will not cause any action by the control logic since it will be compared with the previous sync value to see if a change occurred.

The zero data appears 140 μs. later since the control logic detected a no change in the fine sync value as above.

The dash interval is 3 times as long as the dot interval. The baud rate will determine the exact length of the intervals which will be multiples of the 140 μs. memory cycle time. The length of Teletype signals will also be controlled by the baud rate.

Line decoder output pulse may occur anywhere within the 140 μs. memory cycle time. The data signal (HSSDB) will occur within the time the line decoder pulse occurs.

Figure 14:
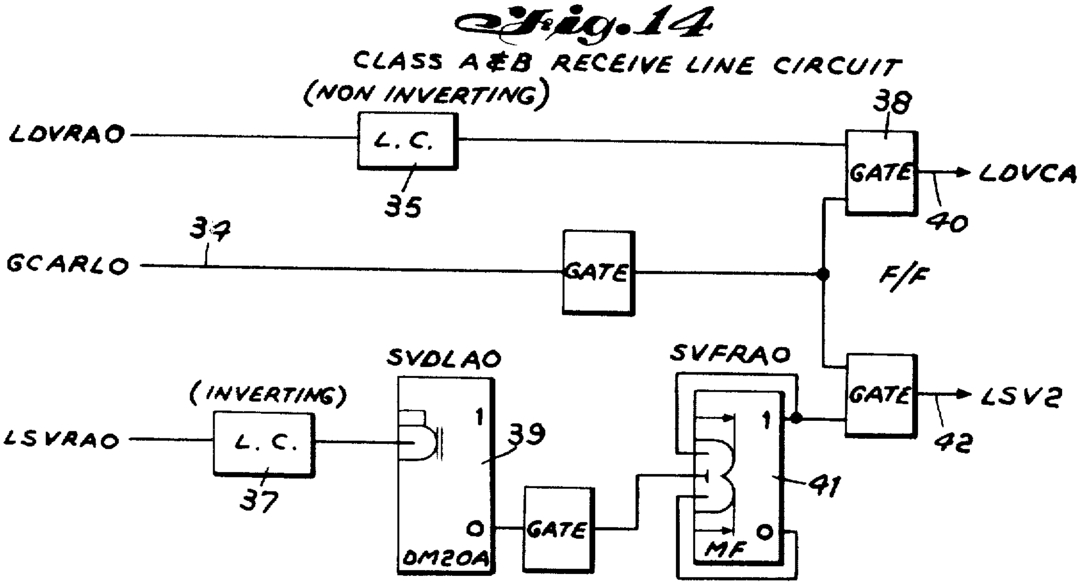
FIG. 14 is a logic diagram of the class A and B receive line circuit.

Turning now to FIG. 14 it should be noted that the per line logic can be used for Teletype, Morse code or synchronous receive operation. The following abbreviations identify the various lines involved.

GCARLO—gate class A receive line O
GCASLO—gate class A send line O
GCCRLO—gate class C receive line O
GCCSLO—gate class C send line O
LC—level changer
HSSDB—high speed send data bus
LDVRAO—line data value—receive class A line O
LSVRAO—line sync value—receive class A line O
LSSDBI—low speed send data bus—"one bus"
LSSDBO—low speed send data bus—"zero bus"
LSVSAO—line sync value—send class A line O
LDVCA—line data value class A
LSVZ—line sync value
LDVSAO—line data value—send class A line O
LSVI—line sync value
LDVRCO—line data value—receive class C line O
LDVCC—line data value class C
LDVSCO—line data value—send class C line O
SVDLAO—sync value delay class A line O
SVFRAO—sync value flip flop—receive class A line O
DBAO—data buffer class A line O
SVFSAO—sync value flip flop—send class A line O
SFFAO—send flip flop—class A line O
SFFCO—send flip flop—class C line O For Teletype or Morse, only the three top circuits are used. When the GCARLO line 34 is activated, the line hardware is selected. Then the line data signal, LDVRAO, passing through the LC level changer 35 is gated through the AND gate 38 onto the common bus 40, LDVCA. All other line hardware is gated off at this time since only this lines selection signal GCARLO is on. If this line were synchronous, a sync signal line 36 LSVRAO would be hooked to the level changer 37 then through the variable delay 39 SVDLAO and then to the sync flip flop 41, SVFRAO. This complements each sync positive transition, indicating the center of a data bit on the data line. When the selection signal line 34, GCARLO is true, the state of this flip flop is put on the sync bus LSVZ, line 42.

Figure 16:
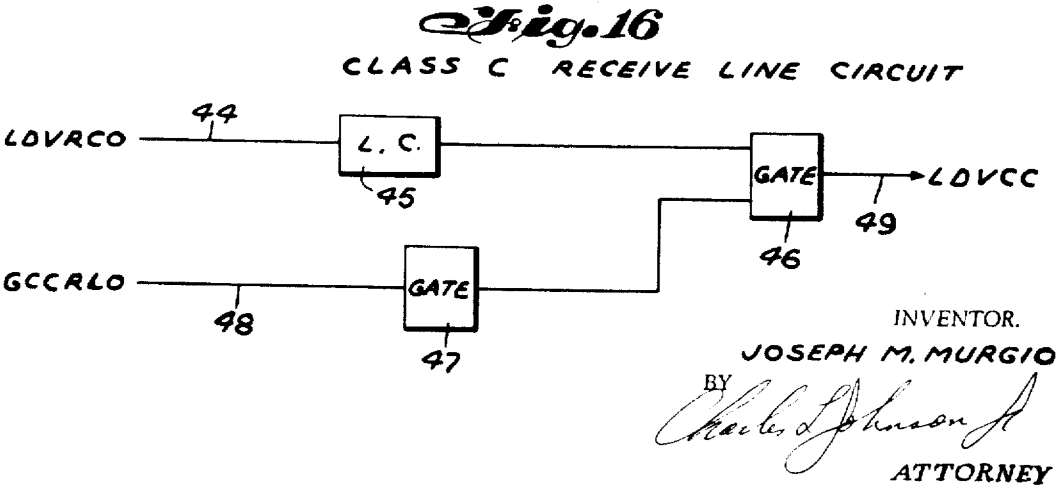
FIG. 16 is a logic diagram of the class C receive line circuit.
Figure 7:
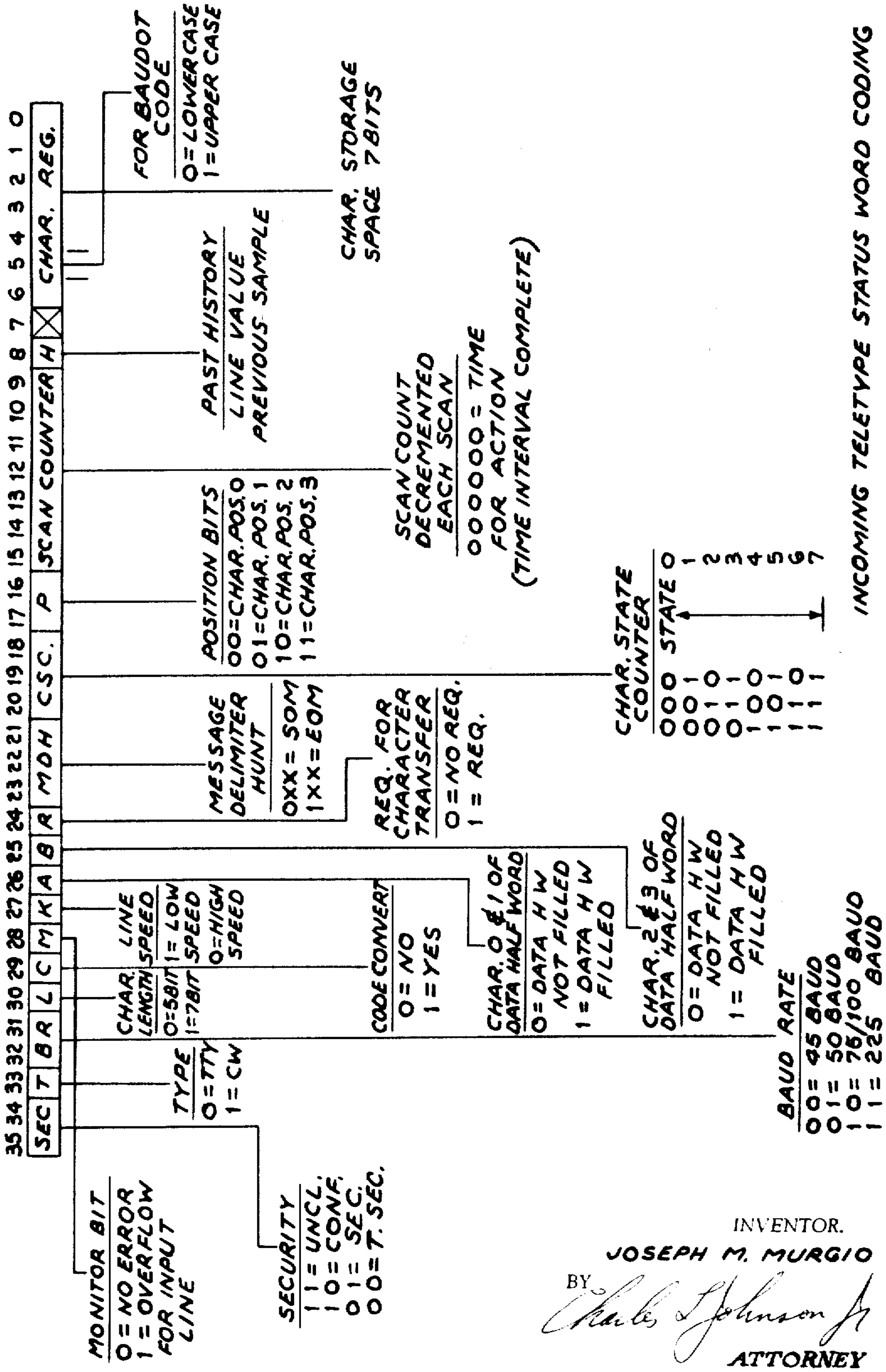
FIG. 7 is a schematic of the incoming teletype status word coding.
Figure 8:
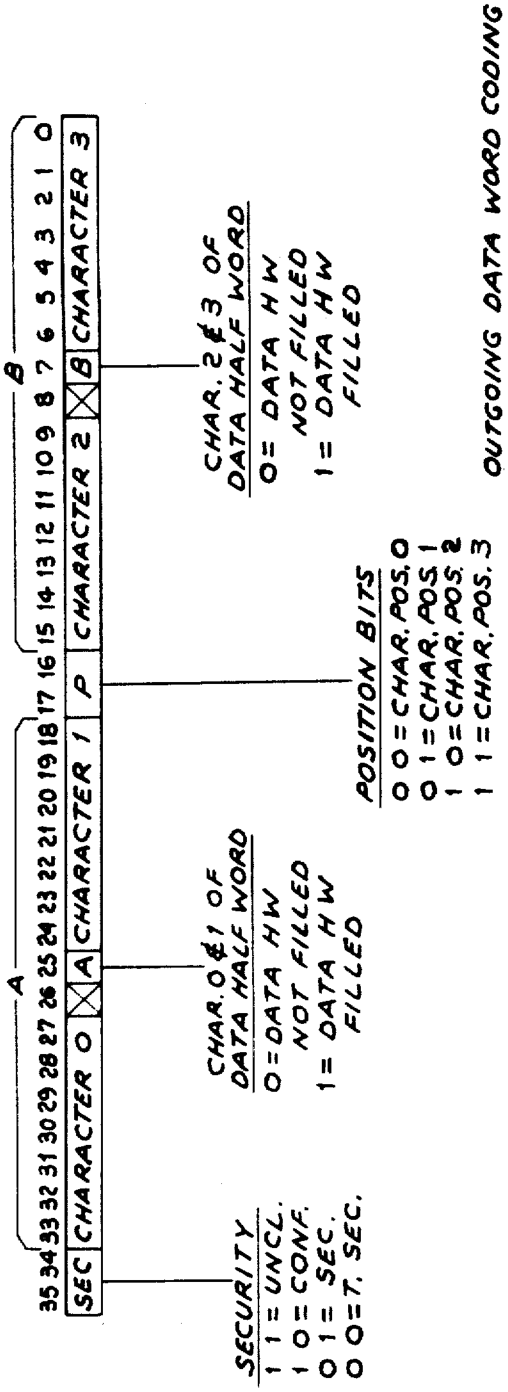
FIG. 8 is a schematic of the outgoing data word coding.
Figure 9:
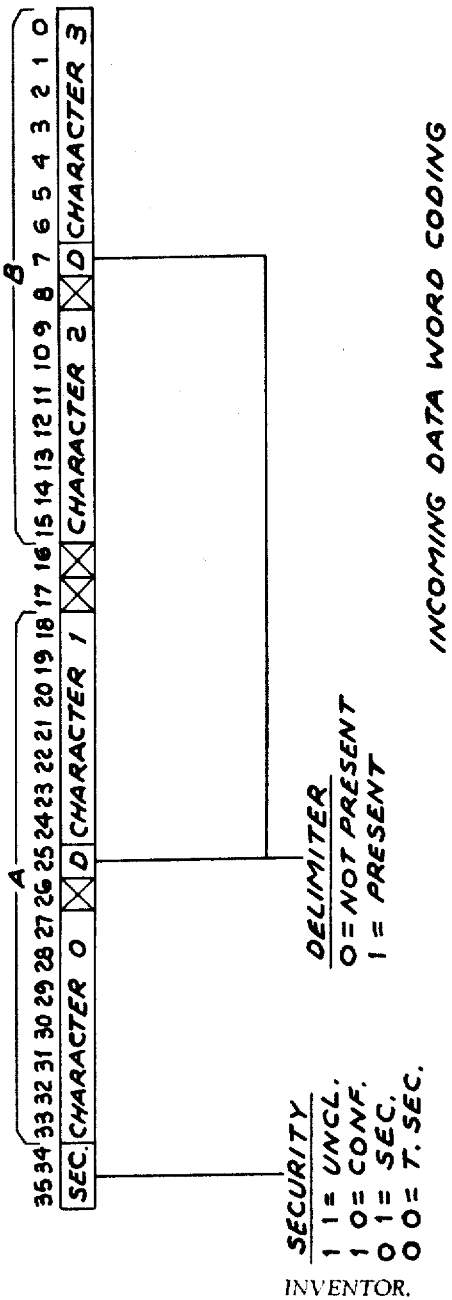
FIG. 9 is a schematic of the incoming data word coding.
Figure 10:
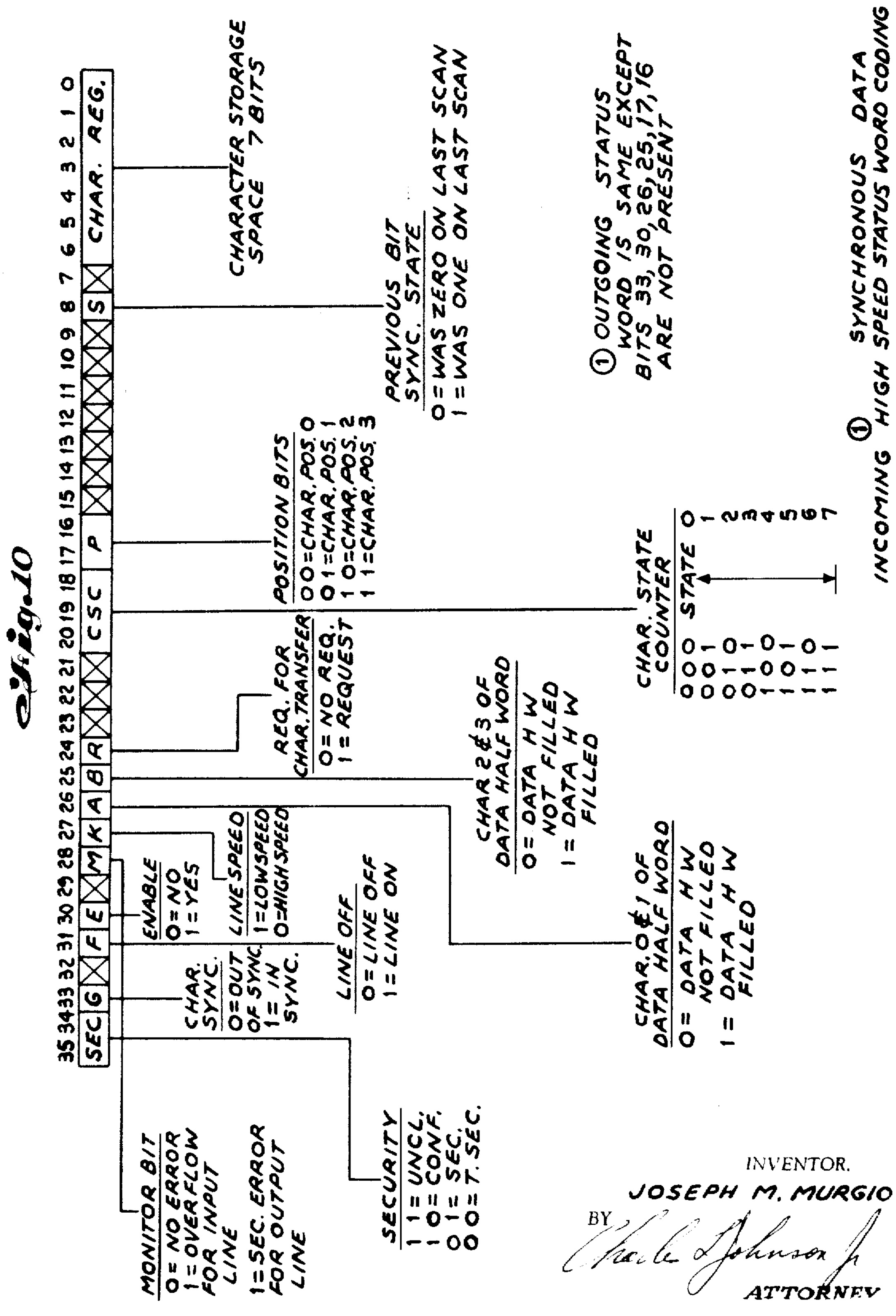
FIG. 10 is a schematic of the synchronous data incoming high speed status word coding.
Figure 11:
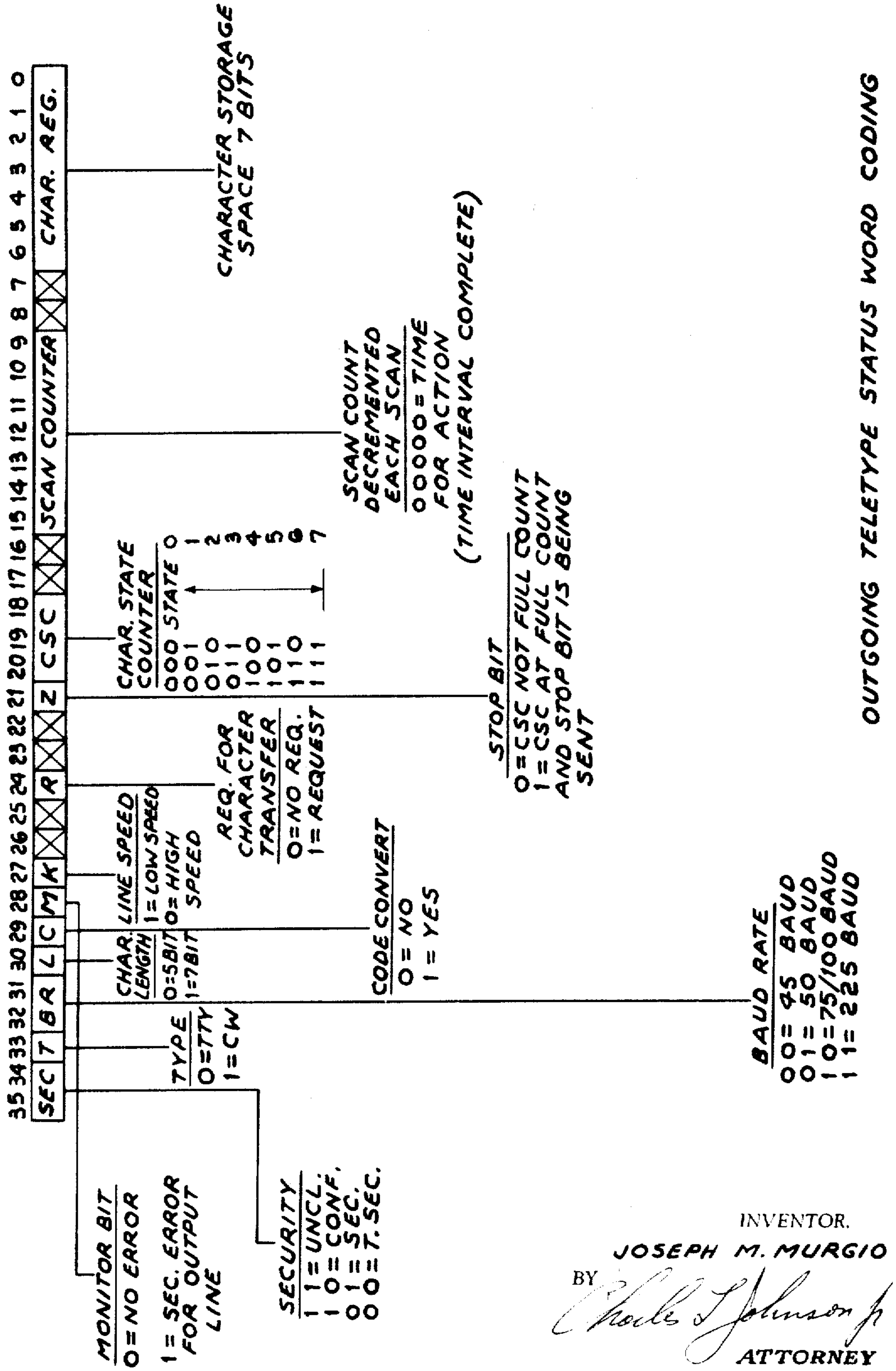
FIG. 11 is a schematic of the outgoing teletype status word coding.
Figure 12:
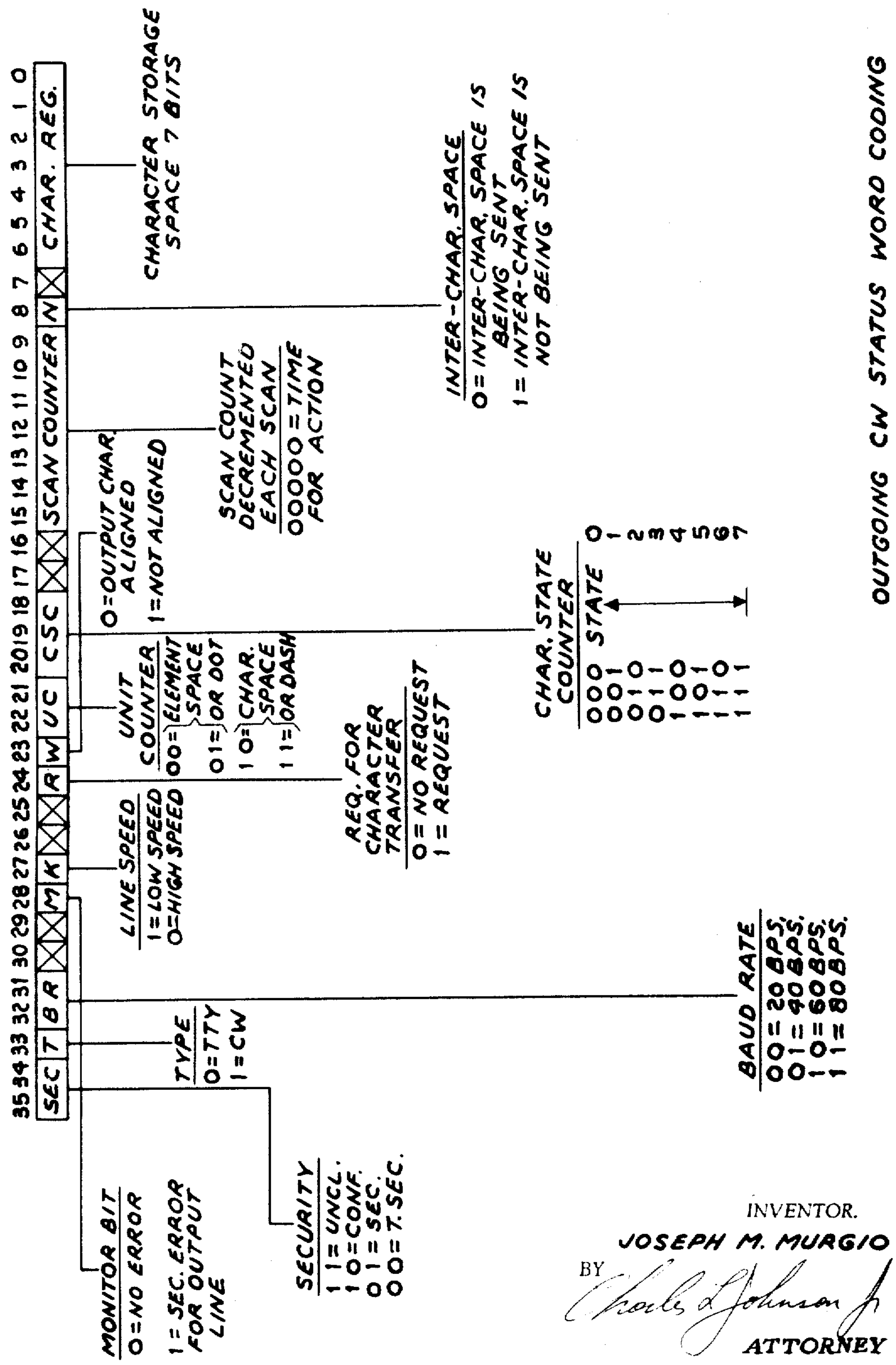
FIG. 12 is a schematic of the outgoing CW status word coding.
Figure 13:
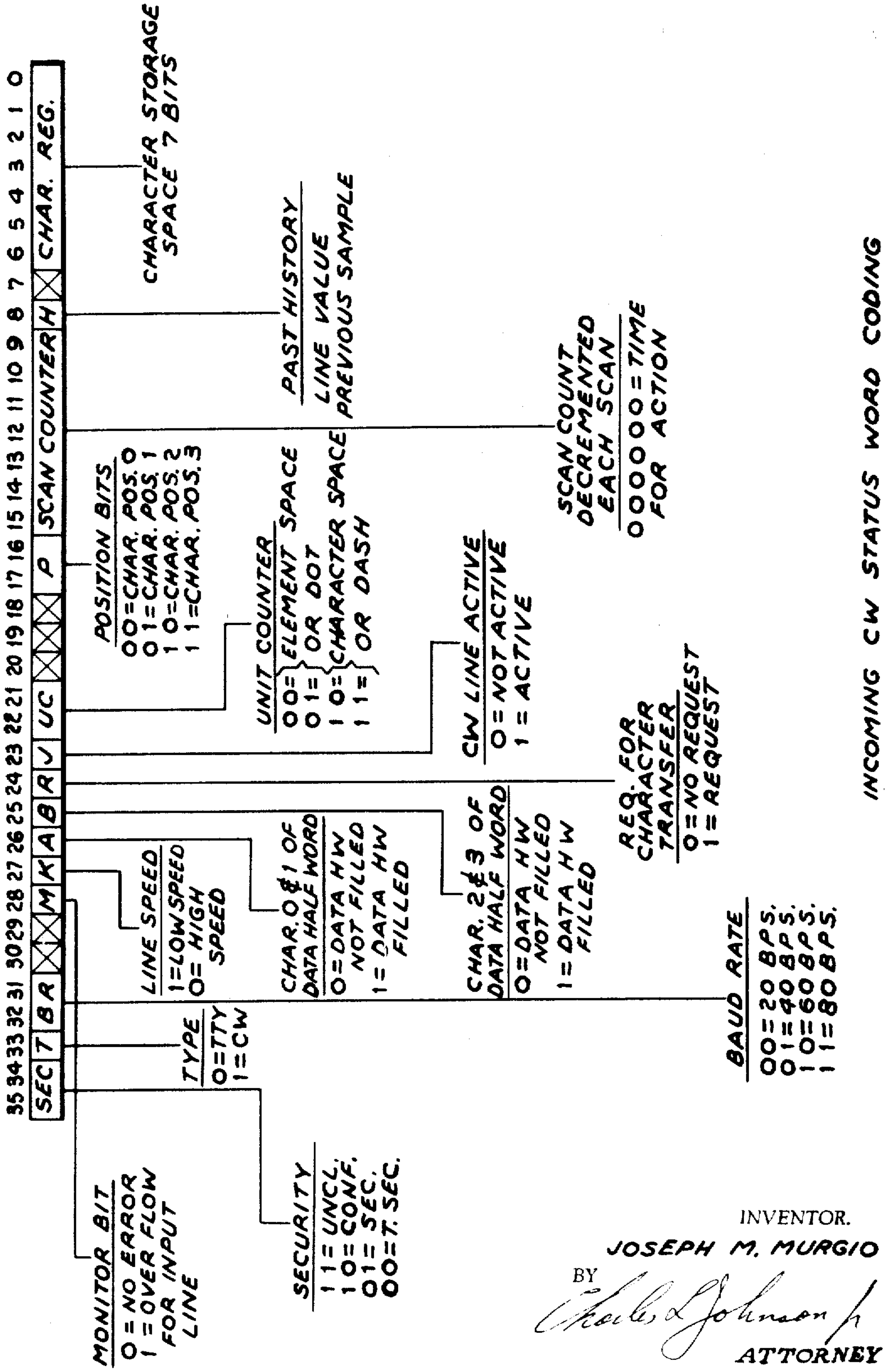
FIG. 13 is a schematic of the incoming CW status word coding.

The class C receive line circuit of FIG. 16 is identical in operation to the first or upper section of FIG. 14. Since class C lines can only be Teletype or Morse, no sync flip flop is required. The input line 44 passes through the level changer 45 and is gated by gate 46 via gate 47 from selection signal line 48 to the common bus 49.

Figure 17:
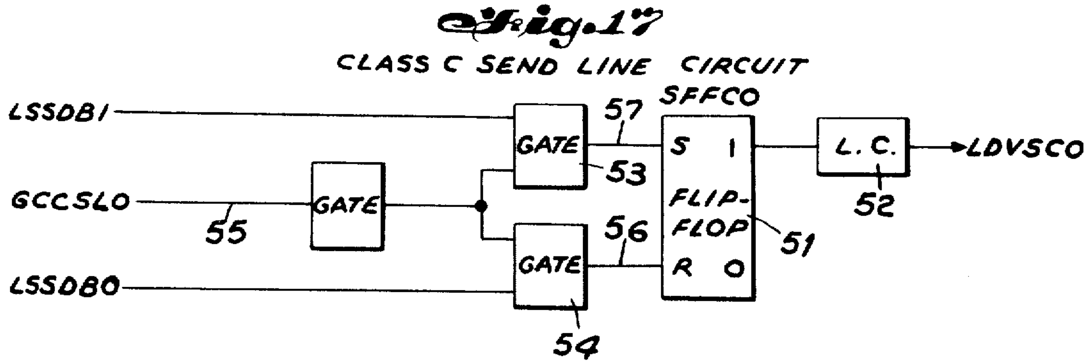
FIG. 17 is a logic diagram of the class C send line circuit.

The class C send line circuit is illustrated at FIG. 17. This output hardware consists of a pulse stretch flip-flop SFFCO and an output level changer, and loading gates 53 for a "1" and 54 for a "0." When the selection signal GCCSLO, on line 55, is true, it gates the two busses 56 and 57 to "send zero" and "send one" into the reset and set inputs of the flip-flop 51, putting it into the correct state until the next selection time. This unit is for Teletype or Morse when no sync line is involved.

Figure 15:
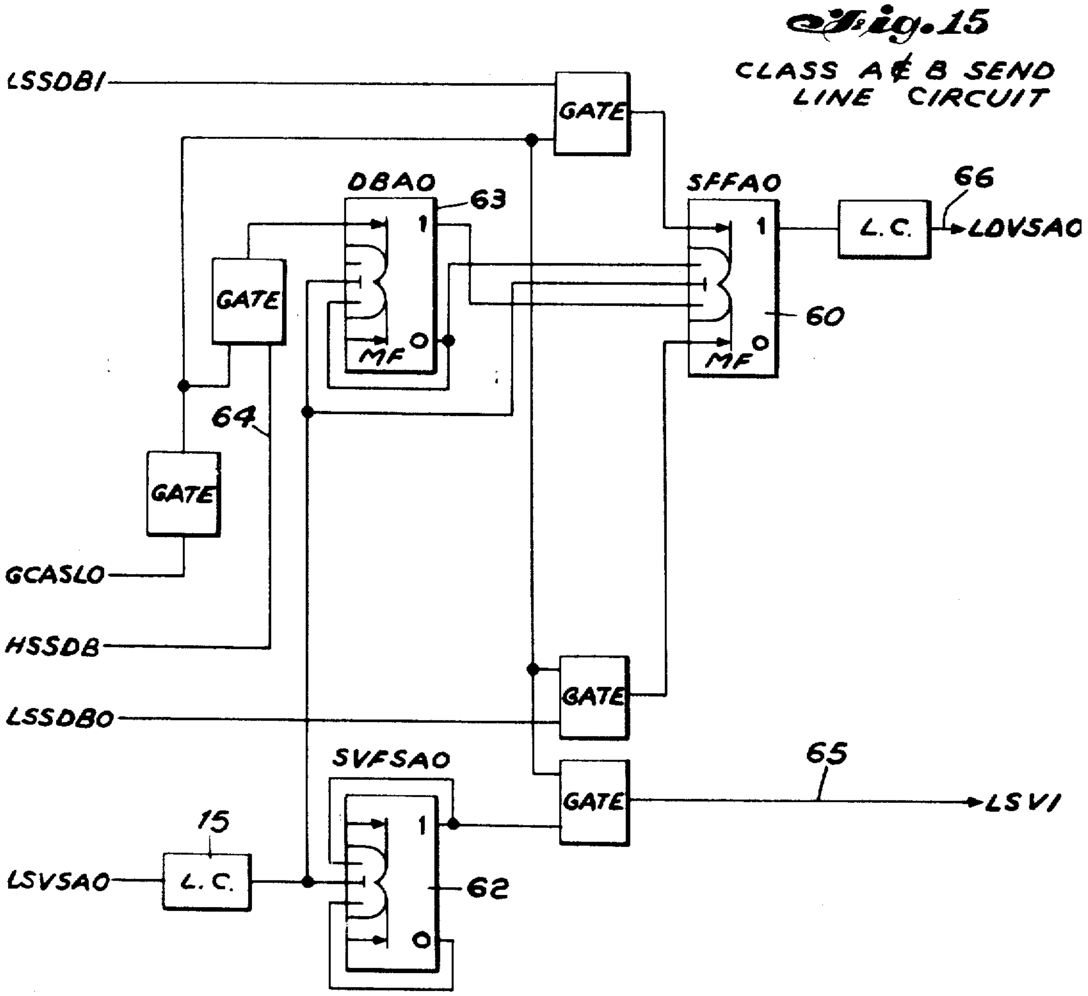
FIG. 15 is a logic diagram of the class A and B send line circuit.

The class A and B send line circuit is illustrated in FIG. 15. The output flip-flop 60, SFFAO and the corresponding gates perform the same Teletype and Morse actions as FIG. 17. In addition the level changer 15 and SVFSAO flip-flop 62 perform the sync count actions similar to flip-flop 41, SVFRAO in FIG. 14. (No delay is needed.)

The additional flip-flop 63, DBAO is an intermediate bit storage for synchronous operation. When selected, and if the HSSDB line 64 is active, a "one" is loaded into DBAO; the next sync pulse, shifts the data bit from DBAO to the output flip-flop, 60 SFFAO and DBAO is reset.

Line 65, LSVI is a sync bus to common hardware which decides if a bit should be sent to the line, while the LSVSAO line 66 represents send class A line O.

Figure 20:
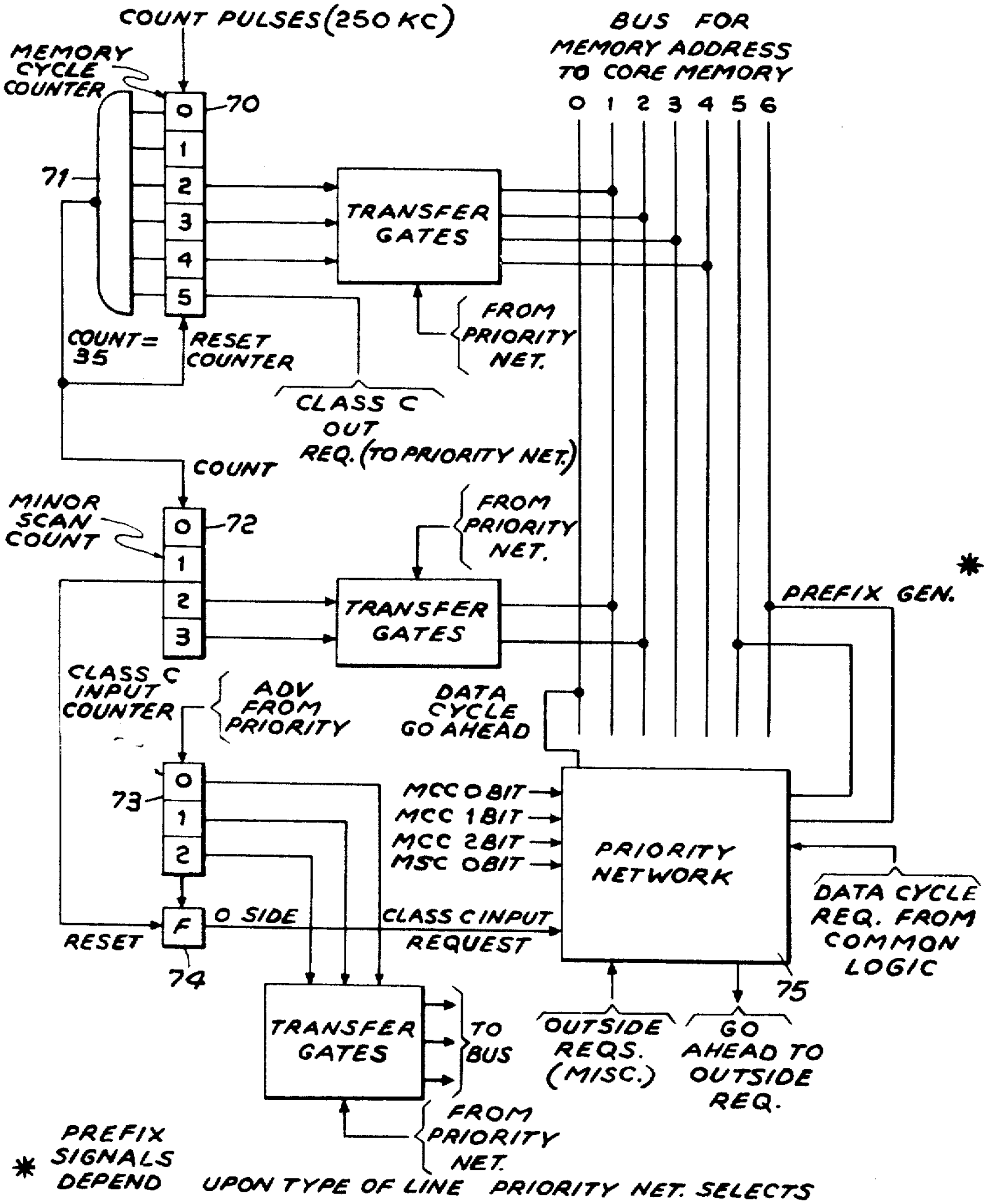
FIG. 20 is a schematic block diagram of the scanner arrangement.

A more detailed description of the scan control 4 may be understood from the scanner block diagram of FIG. 20. The scanner block diagram illustrates how the scan pattern of table IV is generated. The memory cycle counter 20 is stepped at 250 kc., once each 4 msec. or one memory cycle. The "and" gate 71 detects the count of 34 and resets the counter 20—thus giving 35 states of the vertical column of the scan.

At the occurrence of each reset, the minor scan counter 72 is advanced one position; it has 16 states.

The class C counter 73 counts the number of class C lines serviced. It sets the F flip-flop when the counter overflows—i.e. all eight class C lines have been serviced. When the minor scan counter 72 carries from bit 1 to bit 2 (i.e. 4 minor scans have occurred) the flip-flop 74 is reset. The class C counter is stepped each time the priority net services a class C line. In this way, all class C lines are serviced during a group of four minor cycles once and only once.

Each memory cycle (4 msec.), the priority network 75 must make a decision on how to allot the cycle and must generate the proper address. To follow the chart of the scan pattern of Table IV, it uses the bits MCC0, 1, and 2 to differentiate from each group of 8 memory cycles (i.e. for column one, first 8 cycles: AR0, AR1, data/class C, Misc; AS0, AS1, data/class C, data/class C).

Hence at any cycle, the priority net uses the MCC bits, the memory cycle counter bits, the class C input request flip-flop, the request for data cycle from the common logic and outside miscellaneous requests such as transfers into core memory from the computer.

When a decision is made, the priority net 75 generates bits 5 and 6 on lines 76 and 77 of the address and gates the proper counter(s) into the remaining bits to complete the address generation.

Figure 21:
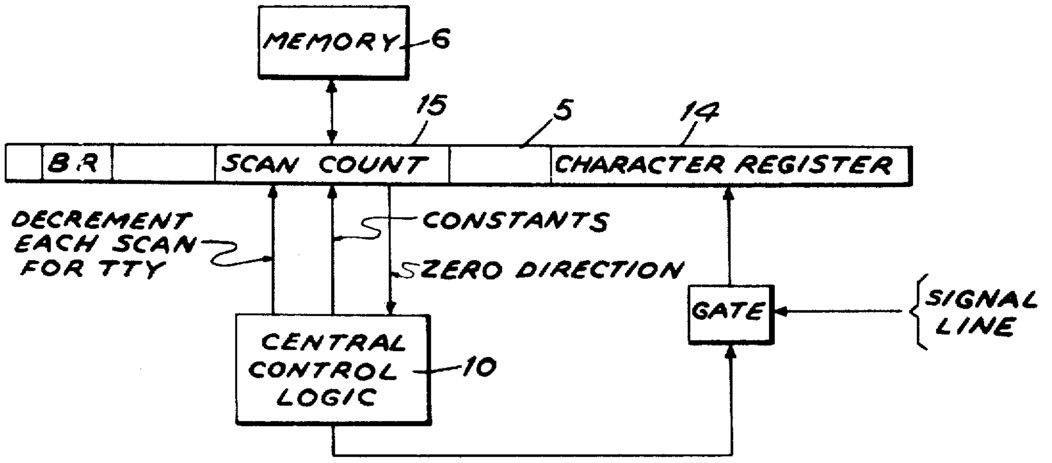
FIG. 21 is schematic of the logic for generating different scan counts.

Turning now to FIG. 21, a description of the logic means for generating different scan counts according to the stored signal rate information will be described.

As individual lines are scanned by review in main buffer, 5, a means for generating a sampling rate to assemble characters from the serial Teletype signal into character register 14 of main buffer 5 is established. Since the line is scanned at a fixed rate (e.g. 2.2 μs. for class C) by scan control 4 it is only necessary to count the number of scans to establish any time interval. The control logic 10 inserts constants into the scan count portion of the status word as a function of the state of a character, that is just starting or between bits within the character and the baud rate of the signal line, as given by the baud rate BR bits 31 and 32. When a character or input begins, the memory cycle during which the lines status word is next scanned, a binary value is inserted into the scan count, 15, such that with decrementing during successive scans by central control logic 10 the count will go to zero at the center of the first data bit. When the scan count 15 goes to zero a zero detection signal is sent to 10. The bit will then be sampled by logic 10 and gated to character register 14 by gate 17 and a new count, equal to the number of scans during the time elapsing to the center of the next bit is now inserted by logic 10 into scan count 15. This process is repeated for each bit. In this way a sampling train is generated by central control logic 10.

Each baud rate has two constants associated; one to measure the time from the start transition of the character to the first data bit and one to measure the time between successive data bits used thereafter. From the above it is seen that an input/output device has been described for operation between a plurality of communication lines and a central processor. The input/output device of the invention includes means for time share scanning the various communication lines so that a saving of individual line hardware is realized. Stored control bits are modified on a per line basis and delimiter hunts for start and stop signal elements control operation. The device is capable of handling several different tyles of communication signals including Teletype and CW and includes means for handling the input and outputs of signals of various speeds. The device is capable of multiple code operation including ASCII and/or Baudot. Device hardware accomplishes the code conversion. The device assembles character pairs for transfer to and from a computer or central processor. An important aspect of the invention is the fact that the scanning means allows more lines to be serviced than could be accommodated by conventional communication apparatus.

TABLE I.—BAUDOT-ASCII CONVERSION TABLE

| Baudot | Lower Case | Lower Case ASCII | Upper Case | Upper Case ASCII |
|---|---|---|---|---|
| 54321 | ---------- | 7654321 | ---------- | 7654321 |
| 11000 | A | 1000001 | - | 0101101 |
| 10011 | B | 1000010 | ? | 0111111 |
| 01110 | C | 1000011 | : | 0111010 |
| 10010 | D | 1000100 | $ | 0100100 |
| 10000 | E | 1000101 | 3 | 0110011 |
| 10110 | F | 1000110 | ! | 0100001 |
| 01011 | G | 1000111 | & | 0100110 |
| 00101 | H | 1001000 | # | 0100000 |
| 01100 | I | 1001001 | 8 | 0111000 |
| 11010 | J | 1001010 | , | 0101100 |
| 11110 | K | 1001011 | ( | 0101000 |
| 01001 | L | 1001100 | ) | 0101001 |
| 00111 | M | 1001101 | . | 0101110 |
| 00110 | N | 1001110 | | 0100000 |
| 00011 | O | 1001111 | 9 | 0111001 |
| 01101 | P | 1010000 | 0 | 0110000 |
| 11101 | Q | 1010001 | 1 | 0110001 |
| 01010 | R | 1010010 | 4 | 0110100 |
| 10100 | S | 1010011 | Bell | 0000111 |
| 00001 | T | 1010100 | 5 | 0110101 |
| 11100 | U | 1010101 | 7 | 0110111 |
| 01111 | V | 1010110 | ; | 0111011 |
| 11001 | W | 1010111 | 2 | 0110010 |
| 10111 | X | 1011000 | / | 0101111 |
| 10101 | Y | 1011001 | 6 | 0110110 |
| 10001 | Z | 1011010 | " | 0100010 |
| 00000 | Blank (Null) | 0000000 | Blank | 0000000 |
| 00100 | Space | 0100000 | Space | 0100000 |
| 00010 | CR | 0001101 | CR | 0001101 |
| 01000 | LF | 0001010 | LR | 0001010 |
| 11011 | FIG | NONE | FIG | NONE |
| 11111 | LTR | NONE | LTR | NONE |

TABLE II.—COMPRESSED MCW CODING

| | |
|---|---|
| A | 0000101 |
| B | 0011000 |
| C | 0011010 |
| D | 0001100 |
| E | 0000010 |
| F | 0010010 |
| G | 0001110 |
| H | 0010000 |
| I | 0000100 |
| J | 0010111 |
| K | 0001101 |
| L | 0010100 |
| M | 0000111 |
| N | 0000110 |
| O | 0001111 |
| P | 0010110 |
| Q | 0011101 |
| R | 0001010 |
| S | 0001000 |
| T | 0000011 |
| U | 0001001 |
| V | 0010001 |
| W | 0001011 |
| X | 0011001 |
| Y | 0011011 |
| Z | 0011100 |
| Blank | 0000000 |
| 0 | 0111111 |
| 1 | 0101111 |
| 2 | 0100111 |
| 3 | 0100011 |
| 4 | 0100001 |
| 5 | 0100000 |
| 6 | 0110000 |
| 7 | 0111000 |
| 8 | 0111100 |
| 9 | 0111110 |
| - | 1100001 |
| ? | 1001100 |
| : | 0111000 |
| =($\overline{AR}$) | 0101010 |
| WAIT ($\overline{AS}$) | 0101000 |
| STOP | 1000101 |
| ' | 1011110 |
| ( | 1101101 |
| ) | 1101101 |
| . | 1010101 |
| , | 1110011 |
| BELL | 0110011 |
| ; | 1101010 |
| /($\overline{DN}$) | 0110010 |
| " | 0101001 |
| BLANK ($\overline{BT}$) | 0110001 |
| SPACE | 0000000 |

KEY: Each compressed MCW code is made up of the Morse dot-dash equivalent expressed as "0" or "1" respectively. For uniqueness, the remaining bits of the seven bit character are filled out by "all zeroes plus a one flag (signifying start of dot-dash equivalents)."

TABLE III.—MESSAGE DELIMITER AND CODE CONVERSION ACTION

The following table is a listing of all delimiter and code conversion special actions. The subscripts refer to the code: A=ASCII, B=Baudot. Letters in parenthesis indicate a single character, i.e., $(SOM)_A$ is the ASCII Start-of-Message character. The L bit refers to the length bit stored in the port status word. L=1 means seven bit character is being handled; L=0 a five bit character, C is the code bit where C=0 means no code conversion and C=1 means conversion is taking place. In each case, the received character(s) are shown with an arrow indicating the actual character(s) passed to the processor.

Input

ASCII Incoming (L=1) No Conversion Allowed:

| | |
|---|---|
| $(SOM)_A \rightarrow (SOM)_A$ | Set Delimiter Bit. |
| $(EOA)_A \rightarrow (EOA)_A$ | Set Delimiter Bit. |
| $(EOM)_A \rightarrow (EOM)_A$ | Set Delimiter Bit, Fill up data Halfword with blank if necessary. |
| $(EOT)_A \rightarrow (EOT)_A$ | Set Delimiter Bit, Fill up data Halfword. |
| $(NMC)_A \rightarrow$ Deleted | Character Deleted. |

NOTE.—If input is synchronous above actions performed only if Enable bit=1. For Teletype ASCII, Enable bit is not considered.

Baudot Incoming (L=0) Converted to ASCII (C=1):

| | |
|---|---|
| $Z_BC_BZ_BC_B \rightarrow Z_AC_AZ_A\ (SOM)_A$ | Set Delimiter Bit. |
| $N_BN_BN_BN_B \rightarrow N_AN_AN_A\ (EOM)_A$ | Set Delimiter Bit, Fill up data Halfword. |

$(FIG)_B \rightarrow$ Deleted ---------------- Case Bit Set.
$(LTR)_B \rightarrow$ Deleted ---------------- Case Bit Reset.

Baudot Incoming (L=0) No Conversion (C=0):

$Z_B C_B Z_B C_B \rightarrow Z_B C_B Z_B C_B$ ----- Set Delimiter Bit.
$N_B N_B N_B N_B \rightarrow N_B N_B N_B N_B$ --- Set Delimiter Bit, Fill up data Halfword.
$(FIG)_B \rightarrow (FIG)_B$ ---------- No Action.
$(LTR)_B \rightarrow (LTR)_B$ --------- No Action.

Output

ASCII Outgoing (L=1) No Conversion Allowed:

$(SOM)_A \rightarrow (SOM)_A$ ---------------- No Action.
$(EOA)_A \rightarrow (EOA)_A$ ---------------- No Action.
$(EOM)_A \rightarrow (EOM)_A$ ---------------- No Action.
$(EOT)_A \rightarrow (EOT)_A$ ---------------- No Action.

Baudot Outgoing (L=0) Conversion From ASCII to Baudot (C=1):

$(SOM)_A \rightarrow C_B$
$(EOM)_A \rightarrow N_B$
$(EOA)_A \rightarrow (BL)_B$
$(EOT)_A \rightarrow (BL)_B$ NOTE.—(1) Automatic Insertion of Fig. Ltrs. (2) Any undefined $(Char)_A \rightarrow (BL)_B$.

Baudot Outgoing (L=0) CP Supplying Baudot (C=0) No Actions.

corresponding memory storage cells and between said corresponding memory storage cells and said output lines; and second transfer means coupled in plural bit groups between the memory storage cells corresponding to said input/output lines and the central processor computer.

2. Apparatus according to claim 1 wherein the periodic scanning means includes timing means common to all of the said lines for timing the arrivals of incoming pulse data signal bits on said input lines and the departures of outgoing pulse data signal bits carried on said output lines.

3. Apparatus according to claim 2 wherein to establish a phase control to allow center of a bit sampling, the timing means includes countdown means for scanning the input/output lines whereby time segments are counted from an initial line signal sample and when the count reaches zero, indicating the time for the next sample, the line is sampled to determine the signal value.

4. Apparatus according to claim 3 wherein the said scanning means includes logic means for generating different scan counts according to the stored signal rate information so that the countdown means will allow line signal sampling at a plurality of selectable rates so as to provide operation for a variety of codes having different code element repetition rates, and means allowing the selected parameter for a line to be stored in said memory unit and modified.

TABLE IV.—CAPE IOC SCAN PATTERN

| Memory Cycle Count | Minor Scan Count | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | AR0 | AR1 | AR0 | AR1 | AR0 | AR1 | AR0 | AR1 | AR0 | AR1 | AR0 | AR1 | AR0 | AR1 | AR0 | AR1 |
| 1 | AR1 | AR0 | AR1 | AR0 | AR1 | AR0 | AR1 | AR0 | AR1 | AR0 | AR1 | AR0 | AR1 | AR0 | AR1 | AR0 |
| 2 | X | X | CR0 | CR1 | | CR0 | | | | CR0 | | | | CR0 | | |
| 3 | | | X* | X* | | | | | | | | | | | | |
| 4 | AS0 | AS1 | AS0 | AS1 | AS0 | AS1 | AS0 | AS1 | AS0 | AS1 | AS0 | AS1 | AS0 | AS1 | AS0 | AS1 |
| 5 | AS1 | AS0 | AS1 | AS0 | AS1 | AS0 | AS1 | AS0 | AS1 | AS0 | AS1 | AS0 | AS1 | AS0 | AS1 | AS0 |
| 6 | X | X | CR1 | | | CR1 | | | | CR1 | | | | CR1 | | |
| 7 | X | X | X* | | | | | | | | | | | | | |
| 8 | AR2 | AR3 | AR2 | AR3 | AR2 | AR3 | AR2 | AR3 | AR2 | AR3 | AR2 | AR3 | AR2 | AR3 | AR2 | AR3 |
| 9 | AR3 | AR2 | AR3 | AR2 | AR3 | AR2 | AR3 | AR2 | AR3 | AR2 | AR3 | AR2 | AR3 | AR2 | AR3 | AR2 |
| 10 | X | X | CR | | | CR2 | | | | CR2 | | | | CR2 | | |
| 11 | | | X* | | | | | | | | | | | | | |
| 12 | AS2 | AS3 | AS2 | AS3 | AS2 | AS3 | AS2 | AS3 | AS2 | AS3 | AS2 | AS3 | AS2 | AS3 | AS2 | AS3 |
| 13 | AS3 | AS2 | AS3 | AS2 | AS3 | AS2 | AS3 | AS2 | AS3 | AS2 | AS3 | AS2 | AS3 | AS2 | AS3 | AS2 |
| 14 | X | X | CR3 | | | CR3 | | | | CR3 | | | | CR3 | | |
| 15 | X | X | X* | | | | | | | | | | | | | |
| 16 | AR4 | AR5 | AR4 | AR5 | AR4 | AR5 | AR4 | AR5 | AR4 | AR5 | AR4 | AR5 | AR4 | AR5 | AR4 | AR5 |
| 17 | AR5 | AR4 | AR5 | AR4 | AR5 | AR4 | AR5 | AR4 | AR5 | AR4 | AR5 | AR4 | AR5 | AR4 | AR5 | AR4 |
| 18 | X | X | CR4 | | | CR4 | | | | CR4 | | | | CR4 | | |
| 19 | | | X* | | | | | | | | | | | | | |
| 20 | AS4 | AS5 | AS4 | AS5 | AS4 | AS5 | AS4 | AS5 | AS4 | AS5 | AS4 | AS5 | AS4 | AS5 | AS4 | AS5 |
| 21 | AS5 | AS4 | AS5 | AS4 | AS5 | AS4 | AS5 | AS4 | AS5 | AS4 | AS5 | AS4 | AS5 | AS4 | AS5 | AS4 |
| 22 | X | X | CR5 | | | CR5 | | | | CR5 | | | | CR5 | | |
| 23 | X | X | X* | | | | | | | | | | | | | |
| 24 | AR6 | AR7 | AR6 | AR7 | AR6 | AR7 | AR6 | AR7 | AR6 | AR7 | AR6 | AR7 | AR6 | AR7 | AR6 | AR7 |
| 25 | AR7 | AR6 | AR7 | AR6 | AR7 | AR6 | AR7 | AR6 | AR7 | AR6 | AR7 | AR6 | AR7 | AR6 | AR7 | AR6 |
| 26 | X | X | CR6 | | | CR6 | | | | CR6 | | | | CR6 | | |
| 27 | | | X* | | | | | | | | | | | | | |
| 28 | BR0 | BS0 | BR1 | BS1 | BR0 | BS0 | BR1 | BS1 | BR0 | BS0 | BR1 | BS1 | BR0 | BS0 | BR1 | BS1 |
| 29 | BR1 | BS1 | BR0 | BS0 | BR1 | BS1 | BR0 | BS0 | BR1 | BS1 | BR0 | BS0 | BR1 | BS1 | BR0 | BS0 |
| 30 | X | X | X | X | | CR7 | | | | CR7 | | | | CR7 | | |
| 31 | | X | | X | | | | | | | | | | | | |
| 32 | BR2 | | BR3 | CS0 | BR2 | | BR3 | CS1 | BR2 | | BR3 | CS2 | BR2 | | BR3 | CS3 |
| 33 | BR3 | | BR2 | X* | BR3 | | BR2 | X* | BR3 | | BR2 | X* | BR3 | | BR2 | X* |
| 34 | X | | X | X | | | | X | X | | | X | | | | X |

From the above it may be seen that the objects of the invention have been realized. Variations in the preferred embodiment described herein may be made without departing from the invention.

What is claimed is:

1. A data signal exchange for operation between a plurality of input/output transmission lines and a central processor computer comprising:

a memory unit having a storage cell consisting of multiple bits reserved therein for and corresponding to each of said transmission lines;

means for periodically scanning said lines and said corresponding storage cells in a predetermined scanning sequence, said sequence adapted for different levels of service dependent upon line speed;

first transfer means coupled to said scanning means for transferring pulse data signal bits on a bit-by-bit multiplex basis between said input lines and said 5. Apparatus according to claim 4 which is adapted to accept bits from input lines to perform character associated code assembly automatically and to transfer the bits to said general process computer and to perform the reverse action to the output lines, wherein the transfer means includes conversion apparatus for conversion of the signal elements from one code to another during internal transfers from a character assembly area to a code assembly area.

6. Apparatus according to claim 5 wherein the conversion apparatus includes means for the conversion of signals from the ASCII to Baudot codes.

7. Apparatus according to claim 4 wherein the scanning means provides variable scanning rates to various lines whereby some lines will receive time-shared monitoring at closer time intervals than others so as to provide input/output connections and service to more lines than could be provided for by a single scan rate.

8. Apparatus according to claim 7 wherein the scanning means provides apparatus for automatically scanning a plurality of input/output lines at a plurality of scanning rates.

9. Apparatus according to claim 1 including means for detecting certain character or character sequences as message delimiters and the reporting of this detection to the central processor.

References Cited

UNITED STATES PATENTS

| | | | |
|---|---|---|---|
| 3,311,886 | 3/1967 | Herman | 340—172.5 |
| 3,373,418 | 3/1968 | Cham | 340—172.5 |

PAUL J. HENON, *Primary Examiner.*

JOHN P. VANDENBURG, *Assistant Examiner.*